UNITED STATES PATENT OFFICE 3,369,040
Patented Feb. 13, 1968

3,369,040
POLYMERCAPTANS AND THEIR PREPARATION FROM EPITHIO COMPOUNDS
William De Acetis, Berkeley, Calif., assignor to Shell Oil Company, New York, N.Y., a corporation of Delaware
No Drawing. Continuation-in-part of application Ser. No. 63,961, Oct. 21, 1960. This application Oct. 19, 1962, Ser. No. 231,852
11 Claims. (Cl. 260—468)

This application is a continuation-in-part of my application Ser. No. 63,961, now abandoned filed Oct. 21, 1960.

This invention relates to new sulfur-containing compounds and to their preparation. More particularly, the invention relates to new polymercaptans containing at least four —SH groups which are particularly valuable as curing agents for polyepoxides, and to a method for preparing the new polymercaptans.

Specifically, the invention provides new and particularly useful polymercaptans which possess at least two

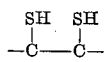

groups, and preferably 2 to 6 such groups, and in addition preferably an activating group in the vicinity of the

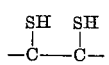

groups, such as, for example, an ester, ether, amide, imide or urethane group, or a cyclic group.

As a special embodiment, the invention further provides a process for preparing the new polymercaptans as by reacting polythiiranes with hydrogensulfide, or more preferably by reacting materials, such as polyepoxides, polyhalides, polythirranes and polythiocyanates, with xanthates to form cyclic trithiocarbonates, and then reducing the trithiocarbonates to form the polymercaptans.

The invention also provides a method for using the above-described new polymercaptans for curing polyepoxides which comprise mixing and reacting the polyepoxide which contains more than one vic-epoxy group with one or more of the above-described polymercaptans, preferably in the presence of an activator, such as a tertiary amine.

Polyepoxides, such as glycidyl polyethers of polyhydric phenols, can be cured by reaction with various types of amines, acids and anhydrides. These materials, however, are not particularly effective when used at lower temperatures such as the order of 0° to 15° C., as a cure at this temperature takes considerable time. This defect places considerable limitations on the use of epoxy resins for applications such as treatment of roads, runways, and the like which must be accomplished over a wide range of temperatures.

It is an object of the invention, therefore, to provide a new class of polymercaptans which are particularly useful as low temperature curing agents for epoxy resins. It is a further object to provide new polymercaptans and method for their preparation. It is a further object to provide a method for preparing new polymercaptans from polythiirane compounds. It is a further object to provide a method for preparing new polymercaptans from polyepoxides, polyhalides, polyepisulfide, polythiocyanates and the like. It is a further object to provide new polymercaptans which can be used to cure epoxy resins to hard insoluble infusible products at low temperatures. It is a further object to provide new polymercaptans which can be used to cure epoxy resins to form products having excellent hot hardness and good solvent resistance. It is a further object to provide new cyclic trithiocarbonates which are particularly useful and valuable in industry. These and other objects will be apparent from the following detailed description thereof.

It has now been discovered that these and other objects may be accomplished by the new polymercaptans of the present invention which comprise products possessing at least two

groups, and preferably 2 to 6 such groups and in addition preferably an activating group, such as, for example, an ester, ether, amide, imide or urethane group or a cyclic group. It has been surprisingly found that these particular compounds are particularly effective for the cure of polyepoxides when used at the lower reaction temperatures such as, for example, from 0° C. to 15° C.; although the reaction takes place at the lower temperatures and resulting products still possess excellent hardness, good heat resistance and good solvent resistance.

The new polymercaptans of the present invention are those compounds possessing at least two

groups, and preferably 2 to 6 such groups, and in addition preferably an activating group in the vicinity of the

groups, such as, for example, an ester, ether, amide, imide or urethane group or cyclic group. In addition, the compounds may be aliphatic, cycloaliphatic, aromatic or heterocyclic and may be saturated or unsaturated. The compounds may also be monomeric or polymeric.

Examples of the new compounds include, among others, polymercapto-substituted ethers such as tri(2,3-dimercaptopropyl) ether of glycerol, di(3,4-dimercaptobutyl) ether of diethylene glycol, di(2,3-dimercaptohexyl) ether of 1,4-butanediol, di(2,3-dimercaptocyclohexyl) ether of 1,5-pentanediol, tri(2,3-dimercaptopropyl) 1,2,6-hexanetriol, di(2,3-dimercaptopropyl) ether of sulfonyldipropanol, di(2,3-dimercaptopropyl) ether of 1,4-dimethylolbenzene, tri(2,3-dimercaptobutyl) ether of trimethylpropane, poly(2,3-dimercaptopropyl) ether of polyallyl alcohol, di(3,4-dimercaptobutyl) ether, di(2,3-dimercaptopropyl) ether, di(2,3-dimercaptopropyl) ether of resorcinol, di(3,4-dimercaptohexyl) ether of resorcinol, tri-(3,4-dimercaptooctyl) ether of 1,3,5-trihydroxybenzene, di(2,3-dimercaptopropyl) ether of 2,2-bis(4-hydroxyphenyl)propane, di(3,4-dimercaptobutyl) ether of 2,2-bis-(4 - hydroxyphenyl)butane, tetrakis(2,3 - dimercaptopropyl) ether of 1,1,2,2-tetra(4-hydroxyphenyl)ethane, tetrakis(3,4-dimercaptobutyl) ether of 1,1,5,5-tetra(4-hydroxyphenyl)pentane, di(3,4-dimercaptohexyl) ether of 2,2 - bis(4 - hydroxyphenyl)sulfone, di(3,4-dimercaptobutyl) ether of 2,2-bis(4-hydroxy-5-methoxyphenyl) 1,1-dichloropane, and the like.

Other examples include the polymercapto-substituted esters, such as, di(2,3-dimercaptopropyl) phthalate, di-(3,4-dimercaptobutyl) tetrachlorophthalate, di(2,3-dimercaptopropyl) terephthalate, di(3,4-dimercaptohexyl) adipate, di(2,3-dimercaptobutyl) maleate, di(2,3-dimercaptopropyl) sulfonyldibutyrate, di(3,4-dimercaptooctyl) thiodipropionate, di(2,3-dimercaptohexyl) citrate, di(3,4-dimercaptoheptyl) cyclohexanedicarboxylate, poly(2,3-dimercaptopropyl) ester of polyacrylic acid, poly(2,3-dimercaptohexyl) ester of polymethacrylic acid, and the like, and esters wherein the mercapto group is or are in the acid portion of the molecule, such as 2,3-mercaptopropyl 2,3-dimercaptopropionate, 3,4-dimercaptohexyl 3,4 - dimercaptohexanoate, 2,3-dimercaptopropyl 2,3-dimercapto - 4-methylbutyrate, diethyl 8,9,12,13-tetramercaptoeicosanedioate, diethyl 7,8,11,12-tetramercaptooctadecanedioate, dibutyl 6,7,10,11-tetramercaptohexadecanedioate, dibenzyl 8,9,12,13 - tetramercaptoeicosanedioate and the like.

Still other examples include the polyesters such as theoretically obtained by reacting a polycarboxylic acid or anhydride with a polyhydric alcohol, such as, for example, polyesters of 8,9,12,13-tetramercaptoeicosanedioic acid and glycerol, hexanetriol, polyethylene glycol and the like, polyesters of 6,7,10,11-tetramercaptohexadecanedioic acid and ethylene glycol, glycerol, 1,2,6-hexanetriol, polypropylene glycol and the like.

Still other examples include the polymercapto-substituted hydrocarbons, such as, for example, 2,2-bis(2,3-dimercaptocyclohexyl) propane, 1-(2,3-dimercaptopropyl) 2,3-dimercaptocyclohexane, 1,4 - bis(2,3 - dimercaptopropyl) benzene, 2,4,6-tri(2,3-dimercaptopropyl) phenol, 1,2,4,5 - tetramercaptocyclohexane, and 2,4,6 - tri(3,4 - dimercaptobutyl) benzoic acid and the like.

Still other examples include the polymercapto-substituted polyamines, such as, for example, N,N-bis(2,3-dimercaptopropyl) phthalamide, N,N-bis(2,3-dimercaptopropyl) adipamide, N,N-bis(2,3-dimercaptopropyl) maleic acid amide and the like. Also included are examples of polymercapto-substituted polyamines themselves, such as N,N-bis(2,3-dimercaptopropyl) aniline, N,N-bis(2,3-dimercaptopropyl) phthalamide, N,N-bis(2,3-dimercaptoproply) adipamide, N,N-bis(2,3-dimercaptopropyl) maleic Still other examples include the polymeric polymercaptans, such as may be obtained by polymerizing or copolymerizing dimercapto-substituted unsaturated compounds as 1,2-dimercapto-3,4-butene and the like, or by homopolymerization or copolymerization of polyunsaturated compounds, such as butadiene or isoprene, and converting the unsaturated groups remaining in the polymer to dimercapto groups by the hereinafter described technique of epoxidation, conversion of the epoxide to the epithio group and reacting that with hydrogen sulfide. Examples of monomers that may be copolymerized with the above-noted polyunsaturated compounds include, among others, acrylonitrile, styrene, alphamethylstyrene, methyl methacrylate, methyl acrylate, ethyl acrylate, maleic acid, diethyl maleate, allyl acetate, vinyl acetate, vinyl benzoate, chloroallyl benzoate, divinyl ether of ethylene glycol, dimethacrylate ester of ethylene glycol and the like, and mixtures thereof.

Particularly preferred polymercaptans include the polymercapto substituted ethers containing from 2 to 6

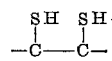

groups and not more than 24 carbon atoms, and particularly those of the formula

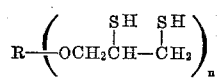

wherein $n$ is 2 to 6 and R is a radical derived from a polyhydric alcohol or phenol by removing $n$ OH groups.

Also particularly preferred polymercaptans include the polymercapto-substituted esters containing from 2 to 6

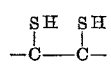

groups and not more than 24 carbon atoms, and especially those of the formula

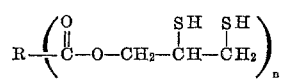

wherein $n$ is an integer of 2 to 6 and R is a residue of a polycarboxylic acid obtained by removing $n$ carboxyl groups.

Also especially preferred are the polymercapto-substituted hydrocarbons containing from 2 to 6

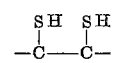

groups and not more than 24 carbon atoms, and particularly those of the formula

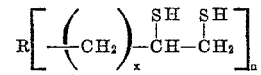

wherein X is an integer of 0 to 6, $n$ is an integer from 2 to 6 and R is a polyvalent hydrocarbon radical.

Coming under special consideration, particularly because of the superior properties as curing agents, are the cyclic polymercaptans, i.e., those having the

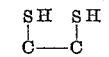

as part of a cyclic structure as

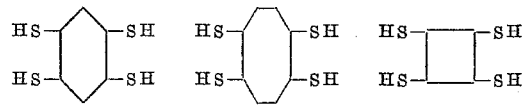

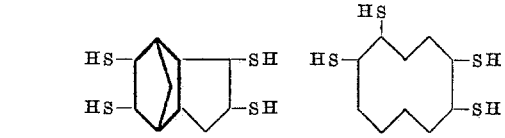

or those wherein the

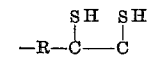

is attached to the ring, such as

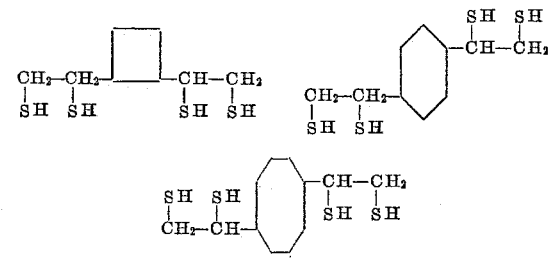

Coming under special consideration are those of the formulae

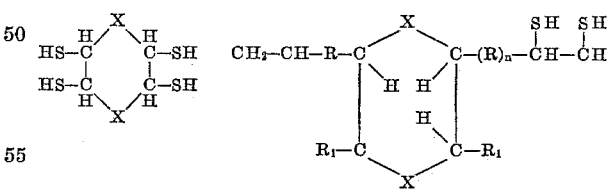

and

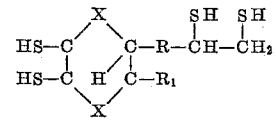

wherein each X is the same or different organic or inorganic bivalent radical, $n$ is 0 to 20, R is a bivalent hydrocarbon radical and $R_1$ is hydrogen or a hydrocarbon radical.

The new polymercaptans of the present invention can be prepared by a variety of methods. They may be prepared, for example, by reacting polythiirane compounds with hydrogen sulfide. The polythiirane compounds themselves may be prepared by reacting polyepoxides with a thiocyanate such as ammonium thiocyanate or a metal thiocyanate as potassium thiocyanate. Detailed description of this method of preparation as well as resulting polythiiranes may be found in my copending application Ser. No. 63,961, now abandoned, filed Oct. 21, 1960, and so much of the disclosure of that application pertinent to these compounds and their preparation is incorporated herewith.

The reaction of the above-described polythiirane compounds and the hydrogen sulfide may be accomplished by merely combining the components together, preferably in the presence of a catalyst. The proportions in which the polythiirane compound and the hydrogen sulfide are combined may vary over a wide range depending on the properties desired and the finished product, i.e. whether one desires a monomeric product or polymeric. If one desires a monomeric product, it is preferred to employ the hydrogen sulfide in excess. Preferably one employs at least 5 moles of $H_2S$ per thiiran group to be converted. Particularly preferred equivalent ratios of $H_2S$ to epoxide vary from 5:1 to 50:1. Polymeric products are obtained in larger amounts when one employs the hydrogen sulfide in lesser amounts. Polymeric polymercaptans are obtained, for example, when the components are added in approximately chemical equivalent amounts.

In preparing the new products, it is generally preferred to saturate a suitable solvent or diluent with the hydrogen sulfide and then add the polythiirane compound to solvent or diluent so as to keep the hydrogen sulfide in excess and prevent possible gelation. This order of additions also preferred in the case of the formation of the polymeric products.

The solvent or diluent employed in the process may be any suitable inert material which will give the necessary fluidity but will not react with the reactants or products. Suitable solvents include toluene, benzene, dioxane, tetrahydrofuran, dibutyl ether, alcohols and the like.

The reaction may be accomplished without the use of catalysts but it is sometimes desirable to employ catalytic quantities of materials, such as alkaline catalysts as sodium hydrosulfide, sodium ethoxide, sodium phenoxide, sodium hydroxide, and the like, and tertiary amines, such as triethylamine, pyridine, benzyldimethylamine, and the like. The amount of these catalysts will generally vary from about 0.01% to 5% by weight.

The temperature employed in the reaction may vary over a considerable range. In general, the reaction between the polythiirane and hydrogen sulfide in the presence of the aforementioned catalysts will proceed at a satisfactory rate at temperatures as low as $-15°$ C. to room temperature. Preferred temperatures range from about $0°$ C. to room temperature or about $20°$ C. Increased reaction rates may be obtained by application of heat and temperatures up to say $50°$ C. may be successfully employed. In some instances, such as where an excess of hydrogen sulfide is to be employed, it may be desirable to conduct the reaction at the lower temperatures so as to increase solubility of hydrogen sulfide in the reaction mixture.

The reaction is conducted in the substantial absence of molecular oxygen. This is preferably accomplished by employing an inert atmosphere such as in the presence of hydrogen sulfide vapor or by the addition of nitrogen and the like. This is particularly true where the desired product is to possess active mercapto groups as it has been found that the presence of oxygen and peroxides accelerate the oxidation of the mercapto groups into bisulfide linkages.

The reaction may be conducted at atmospheric, superatmospheric or subatmospheric pressures. It is generally preferred to utilize superatmospheric pressures.

At the completion of the reaction, the polymercaptans may be recovered by a variety of methods obvious to those skilled in the art, such as solvent extraction, filtration, precipitation, distillation, and the like.

The new products may also be prepared by reacting a polyfunctional material, such as a polyepoxide, polyhalide, polythiirane and polythiocyanate wherein the functional elements or groups involve adjacent carbon atoms, with an xanthate so as to form a cyclic trithiocarbonate, and then reducing the trithiocarbonate with a strong reducing agent, such as lithium aluminum hydride, to form the polymercaptan. This reaction may be illustrated by the following showing the preparation of bis(2,3-dimercaptopropyl) ether from diglycidyl ether:

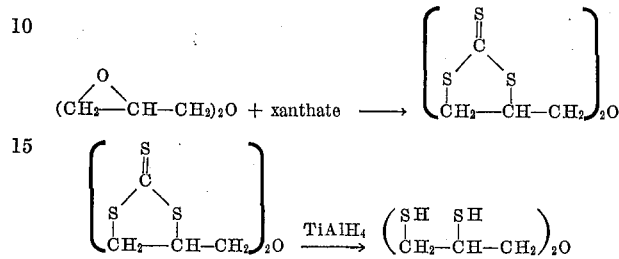

The polyepoxides that may be used in this type of reaction may be exemplified by the polyepoxides described herein for cure with the new polymercaptans. The polyhalides that may be used include those compounds possessing at least two sets of groupings wherein halogen atoms, and preferably chlorine atoms are attached to adjacent carbon atoms, such as, for example, 1,2,5,6 - tetrachlorooctane, bis(1,2 - dichlorobutyl) ether, 1,2,4,5 - tetrachlorocyclohexane, di(1,2 - dichlorobutyl) phthalate and the like. The polyepisulfides that may be used in this reaction are exemplified in copending patent application Ser. No. 63,961, filed Oct. 21, 1960. The polythiocyanates that may be used in the process include those compounds possessing at least two sets of groupings wherein thiocyanate groups are attached to adjacent carbon atoms, such as, for example, 1,2,4,5-tetrathiocyanopentane and bis(1,2-dithiocyanobutyl) ether.

The xanthates used in the reaction include those of the formula

wherein R is a hydrocarbon radical, such as an alkyl radical as methyl, ethyl and the like, and X is an alkali metal, such as sodium, potassium and the like. The xanthates are preferably formed in situ by conventional method of reacting carbon disulfide with an alcohol, such as methanol, and the alkali metal hydroxide, such as sodium or potassium hydroxide.

The polyfunctional material and the xanthate may be used in a wide range of proportions. It is generally preferred to employ the xanthate in excess and preferably at least 3 to 10 molar excess. In making the xanthate in situ it is preferred to employ an excess of the alcohol so that it may act as a solvent for the reaction. If the xanthate is prepared ahead of time, it may be desirable to add alcohol to the reaction mixture along with the xanthate so that it may act as the diluent or solvent for the reaction. Other solvents or diluents that may be employed include inert materials, such as tetrahydrofuran, toluene, benzene, cyclohexane, and the like and mixtures thereof.

The reaction between the polyfunctional material and the xanthate takes place over a wide range of temperatures. The reaction takes place readily at the lower temperatures and it is generally preferred to conduct the reaction at temperatures ranging from about $15°$ C. to $50°$ C., and still more preferably between $20°$ C. and $30°$ C.

The resulting cyclic trithiocarbonate may be recovered from the reaction mixture or retained therein for reaction with the reducing agent. The trithiocarbonate may be recovered if desired by any suitable means, such as precipitation, filtration, extraction, and the like.

The reducing agent employed in treating the trithiocarbonate may be any strong reducing agent, such as for example, lithium aluminum hydride, sodium borohydride activated with aluminum chloride and the like. These agents are preferably used so as to furnish one mol per trithiocarbonate group to be reduced, and still more preferably from 1 to 3 moles per trithiocarbonate group. It is generally preferred to add the trithiocarbonate to the reducing agent at a slow rate so as to maintain the mixture at a good reflux rate.

At the completion of the reaction, material, such as alcohol, may be added to destroy the reducing agent and the reaction mixture neutralized, washed and otherwise treated to recover the desired polymercaptan. This may be accomplished by solvent extraction, filtration, distillation and the like.

The new polymercaptans of the invention will vary from fluid liquids to solid materials. As indicated above the monomeric products will have the same structure of the basic polythiirane with the exception that the thiirane group will be replaced with the dimercaptan group. The polymeric products will have repeating units joined through —S— groups with the terminal units possessing the

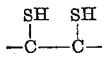

groups.

The new products will be soluble in conventional solvent such as benzene, xylene, toluene, cyclohexane, cyclohexone, and the like and mixtures thereof. The new polymercaptans will also be compatible with great many type of synthetic polymers and tars such as, for example, phenol formaldehyde resins, vinyl resins, coal tar, asphalts, cumerone resins, protein resins, epoxy resins, polyaldehyde resins, and the like.

The new polymercaptans are also highly reactive components in view of at least four reactive mercaptan groups and can be combined with a variety of materials to form new derivatives. For example, as may be reacted with aldehydes, ketone, anhydrides, acids, epoxy groups and isocyanates, and will add to double bonds under central condition.

The new polymercaptans are particularly useful for use as curing agents for polyepoxides. Polyepoxides that may be cured with the new polymercaptans comprise those materials possessing more than one vicinal epoxy group, i.e., more than one

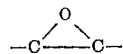

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples includes the epoxidized esters of the polyethylenically unsaturated monocarboxylic acids, such as epoxidized linseed, soybean, perilla, oiticia, tung, walnut and dehydrated castor oil, methyl linoleat, butyl inoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil and the like.

Another group of the epoxy-containing materials used in the process of the invention include the epoxidized esters of unsaturated monohydric alcohols and polycarboxylic acids, such as, for example, di(2,3-epoxybutyl) adipate,
di(2,3-epoxybutyl) oxalate,
di(2,3-epoxyhexyl) succinate,
di(3,4-epoxybutyl) maleate,
di(2,3-epoxyoctyl) pimelate,
di(2,3-epoxybutyl) phthalate,
di(2,3-epoxyoctyl) tetrahydrophthalate,
di(4,5-epoxydodecyl) maleate,
di(2,3-epoxybutyl) terephthalate,
di(2,3-epoxypentyl) thiodipropionate,
di(5,6-epoxytetradecyl) diphenyldicarboxylate,
di(3,4-epoxyheptyl) sulfonyldibutyrate,
tri(2,3-epoxybutyl) 1,2,4-butanetricarboxylate,
di(5,6-epoxypentadecyl) tartarate,
di(4,5-epoxytetradecyl) maleate,
di(2,3-epoxybutyl) azelate,
di(3,4-epoxybutyl) citrate,
di(5,6-epoxyoctyl) cyclohexane-1,2-dicarboxylate, hexane-1,2-dicarboxylate,
di(4,5-epoxyoctadecyl) malonate.

Another group of the epoxy-containing materials includes those epoxidized esters of unsaturated alcohols and unsaturated carboxylic acids, such as 2,3-epoxybutyl 3,4-epoxypentanoate, 3,4-epoxyhexyl 3,4-epoxyhexyl 3,4-epoxypentanoate, 3,4-epoxycyclohexyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials include epoxidized derivatives of polyethylenically unsaturated polycarboxylic acids such as, for example, dimethyl 8,9,12,13-diepoxyeicosanedioate,
dibutyl 7,8,11,12-diepoxyoctadecanedioate,
dioctyl 10,11-diethyl-8,9,12,13-diepoxy-eicosanedioate,
dihexyl 6,7,10,11-diepoxyhexadecanedioate,
didecyl 9-epoxy-ethyl-10,11-epoxyoctadecanedioate,
dibutyl 3-butyl-3,4,5,6-diepoxycyclohexane-1,2-dicarboxylate,
dicyclohexyl 3,4,5,6-diepoxycyclohexane-1,2-dicarboxylate,
dibenzyl 1,2,4,5-diepoxycyclohexane-1,2-dicarboxylate and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis(hydroxyphenol) pentane (epoxy value of 0.514 eq./100 g.) and the like and mixtures thereof.

The amount of new polymercaptans to be employed in the cure of the polyepoxide may vary within certain limits. In general, the polyepoxides are combined with at least .8 equivalents of the polymercaptan. As used herein "equivalent" amount refers to that amount needed to furnish one —SH group per epoxy group to be reacted. Preferably the polymercaptans and polyepoxides are combined in chemical equivalent ratios vary from .8:1.5 to 1.5:8.

It is preferred in some cases to employ activators for the cure. Examples of these include, among others, phenols, sulfides, mercaptans, organic phosphines, organic arsines, organic antimony compounds, amines, amine salts of quaternary ammonium salts, etc. Preferred activators are the phenols, phosphines, arsines, amines, and sulfides, such as, for example benzyldimethylamine dicyandiamide p,p'-bis(dimethylaminophenyl) methane, pyridine, dimethyl aniline, dimethylethanolamine, methyldiethanolamine, morpholine, dimethylaminopropylamine, dibutylaminopropylamine, stearyldimethylamine, tri - n - butyl amine, N,N-dibutyl butylamine, tri-n-hexylamine, ethyl di-n-propylamine, phenylene diamine, diethylene triamine, dibutyl sulfide, dioctyl sulfide, dicyclohexyl sulfide and the like, and mixtures thereof. The salts may be exemplified by the inorganic and organic acid salts of the amines, such as, for example, the hydrochloride, sulfate and acetate of each of the above-described tertiary amines. The quaternary ammonium salts may be exemplified by the following: benzyltrimethylammonium chloride, phenyltributylammonium chloride, cyclohexyltributylammonium sulfate, benzyltrimethylammonium sulfate, benzyltrimethylammonium borate, diphenyldioctylammonium chloride, and the like, and mixtures thereof.

Preferred activators to be used are the sulfides, phosphines and tertiary amines, and more preferably the mono- and diamines wherein the amine hydrogens have been replaced by aliphatic, cycloaliphatic or aromatic hydrocarbon radicals containing not more than 15 carbon atoms, such as, for example, the trialkyl amines, triaryl amines, triarylalkylamines, alkyl arylalkylamines, tricycloalkylamines, alkyl dicycloalkylamines, diaminoalkanes, dialkylene triamines, phenylene diamines and di (aminoaryl) alkanes. Preferred amine salts are the hydrochloride, sulfate and acetate of the above-described preferred amines. The preferred quaternary salts are those of the formula

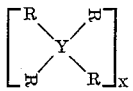

wherein Y is nitrogen, R is an alkyl, aryl or arylalkyl radical, preferably containing no more than 12 carbon atoms and X is chlorine.

The activators noted above are generally employed in amounts varying from 0.1 part to 4 parts per 100 parts of polyepoxide, and preferably from 1 part to 3 parts per 100 parts of polyepoxide.

In curing the polyepoxides, it is usually desirable to have the polyepoxide in a mobile condition when the polymercaptan is added in order to facilitate mixing. The polyepoxides, such as the glycidyl polyether of polyhydric phenols, are generally very viscous to solid materials at ordinary temperature. With those that are liquid, but too viscous for ready mixing, they are either heated to reduce the viscosity, or have a liquid solvent added thereto in order to provide fluidity. Normally solid members are likewise either melted or mixed with a liquid solvent. Various solvents are suitable for achieving fluidity of the polyepoxide. These may be volatile solvents which escape from the polyepoxide compositions containing the adduct by, evaporation before or during the curing such as esters such as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ a polyepoxide, such as one of the glycidyl polyethers of the dihydric phenol, in admixture with a normally liquid glycidyl polyether of a polyhydric alcohol. In fact, two or more of any of the polyepoxides may be used together as mixtures. In such a case, the amount of the adduct added and commingled is based on the average epoxide equivalent weight of the polyepoxide mixture.

Various other ingredients may be mixed with the polyepoxide subjected to cure with the novel adducts including pigments, filler, dyes, plasticizers, resins, and the like.

The polyepoxides may be cured with the new polymercaptans by merely mixing the two components together, preferably in the presence of the above-noted activators. The cure time may vary for a few hours to a few days depending on the type and quantity of reactants and presence of catalyst. In generally, in the presence of activators, the cure takes place readily at room temperature. Fast reaction may be obtained, of course, by applying heat. Preferred temperatures range from about 20° C. to 200° C. With small castings, it is preferred to cure at room temperature and then post cure for a few hours at elevated temperatures, say 40° C. to 170° C.

One important application of the use of the new polymercaptans as curing agents for polyepoxides is in the preparation of laminates or resinous particles reinforced with fibrous textiles. Although it is generally preferred to utilize glass cloth for this purpose, any of the other suitable fibrous materials in sheet form may be employed such as glass matting, paper, abestox paper, mica flakes, cotton batts, duck muslin, canvas and the like. It is useful to prepare the laminates from woven glass cloth that has been given prior treatment with well known finishing or sizing agents therefor, such as chrome methacrylate or vinyl trichlorosilane.

In preparing the laminate, the sheets of fibrous materials are preferably first impregnated with the mixture of the polyepoxide, polymercaptan and activator. This is conveniently accomplished by dissolving the polymercaptan in a solvent and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured by the application of heat. A plurality of the impregnated sheets can be superimposed and the assembly cured in a heated press under a pressure of about 25 to 500 or more pounds per square inch. The resulting laminate is extremely strong and resistant against the action of organic and corrosive solvents.

The new compositions of the invention are particularly outstanding as adhesives. In this application they can be used as a paste or solution depending on the method of preparation as described. Other materials may also be included in the composition, such as pigments, plasticizers, stabilizers and reinforcing fillers, such as aluminum powder, asbestos, powdered mica, zinc dust, bentonite, ground glass fibers, Monetta clay and the like. These fillers are preferably used in amounts varying from about 10 parts to 200 parts per 100 parts of the polyepoxide and polymercaptan compound. Other materials that may be included include other types of resins, such as phenol-aldehyde resins, urea-aldehyde resins, furfural resins, polyacetal resins, carbonate resins, polyamide resins, and the like.

The compositions may be used in the bonding of a great variety of different materials, such as metal-to-metal to other materials, such as plastic, wood-to-wood, glass-to-glass, glass-to-metal, and the like. They are of particular value, however, in the bonding of metals such as aluminum-to-aluminum and steel-to-steel. When applied as an adhesive, the compositions may simply be spread on the desired surface to form films of various thicknesses, e.g., 0.5 mil to 30 mils, and then the other surface superimposed and heat applied. Curing pressures can be light contact pressures up to about 500 p.s.i.

When the compositions are used as adhesives for metal-to-metal bonding, it has sometimes been found advantageous to impregnate cotton, rayon, synthetic fiber or glass cloth textiles with the compositions, and then use the impregnated textiles as a bonding tape for joining the metals. Such tapes provide convenient means for handling and using the compositions in adhesive applications. The tape is inserted between two metals desired to be joined, and the assembly is heated and baked to cure the resin whereby articles are obtained wherein the joined surfaces have not only excellent strength at ordinary temperatures, but also retain good strength even though heated at quite elevated temperatures for long periods of time. A preferred tape for such use comprises a glass fiber textile impregnated or coated with a mixture of the polyepoxide, phthalocyanine compound and atomized aluminum powder or dust.

To illustrate the manner in which the invention may be carried out the following examples are given. It is to be understood, however, that the examples are for the purpose of illustration and that the invention is not to be regarded as limited to any of the specific conditions or reactants recited therein. Unless otherwise specified parts described in the examples are parts by weight.

*Example I*

This example illustrates the preparation and some of the properties of 1-(1,2-dimercaptoethyl) 3,4-dimercaptocyclohexane.

1500 parts of potassium hydroxide was placed in a reaction vessel and 5500 parts of methanol added thereto. The temperature arose to about 70° C. and the vessel was cooled to room temperature. 2440 parts of carbon disulfide was then added at 30° C. Vinylcyclohexene dioxide was pumped into the reaction vessel at the rate of about .5 part per minute. After the addition of about 750 parts of the vinylcyclohexene dioxide, the mixture was stirred for about 60 hours. 3000 parts of water were then added and most of the excess carbon disulfide and methanol removed under vacuum keeping the temperature below 30° C. The precipitate was washed with water and then acetone and dried. The yellow solid precipitate had a melting range of 145–153° C. and contained 55.8% sulfur. The product was identified as having the structure:

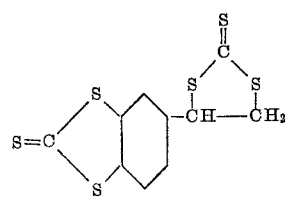

The above-noted thiocarbonate was reduced to the desired polymercaptan in the following manner. 2000 parts of tetrahydrofuran, 500 parts of diethyl ether and 280 parts of lithium aluminum hydride were charged to a reaction vessel and the mixture stirred. The above-noted thiocarbonate was added to 3000 parts of tetrahydrofuran and the resulting slurry was added slowly to the reaction vessel containing the lithium aluminum hydride so as to maintain a good reflux rate over a period of about 2 hours. The mixture was then cooled to 0° C. and 1300 parts of water added. 3000 parts of concentrated HCl was added. The mixture was stirred for 60 hours. The mixture separated into two layers, a clear yellow layer over a grey water layer. The excess acid was neutralized and the organic layer removed. The organic ether layer was washed, dried and the solvent stripped at 50° C. under vacuum to give the crude tetramercaptan. This product was purified by molecular distillation yielding a light yellow liquid identified as 1-(1,2-dimercaptoethyl) - 3,4 - dimercaptocyclohexane SH equivalency 1.59 eq./100 g.

About 100 parts of diglycidyl ether of 2,2-bis(4-hydroxyphenyl)propane was combined with an equivalent amount of the above-described polymercaptan and 1% by weight of benzyldimethylamine and the mixture heated at 100° C. The mixture set up to form a hard insoluble casting.

*Example II*

This example illustrates the preparation and some of the properties of a polymercaptan prepared from di(2,3-epithiopropyl ether) of 2,2-bis(4-hydroxyphenyl)propane.

Into a reaction vessel equipped with a stirrer, addition funnel and an $H_2S$ addition tube were placed 400 parts of acetonitrile. Hydrogen sulfide was bubbled into the acetonitrile until it was saturated. A solution of 50 parts of di(2,3-epithiopropyl ether) of 2,2-bis(4-hydroxyphenyl)propane in 300 parts of acetonitrile was added dropwise to the hydrogen sulfide-acetonitrile solution with continuous stirring and addition of hydrogen sulfide gas over a period of about 5 hours. After the addition was complete, the reaction mixture was stirred for another 30 minutes with continuous hydrogen sulfide addition. At the end of this time, the reaction mixture was filtered to remove a small amount of insoluble matter and the filtrate was concentrated in vacuo, avoiding as much as possible any contact with air. The residue, a slightly yellow solid was dried at high vacuum and room temperature. Yield of crude product was 44 parts. The product identified as di(2,3-dimercaptopropyl ether) of 2,2-bis(4-hydroxyphenyl)propane contained 25.3% sulfur and mercaptan equivalency of 0.77 eq./100 g.

About 100 parts of diglycidyl ether of 2,2-bis(4-hydroxyphenyl)propane was combined with an equivalent amount of the above-described polymercaptan and 1% by weight of benzyldimethylamine and the mixture heated at 100° C. The mixture set up to form a hard insoluble casting.

*Example III*

This example illustrates the preparation and some of the properties of bis(2,3-dimercaptopropyl)ether.

216 parts of KOH was placed in a reaction vessel and 740 parts of methanol added thereto. The temperature arose to about 70° C. and the vessel was cooled to room temperature. 350 parts of carbon disulfide was then added to the vessel slowly with stirring. 100 parts of diglycidyl ether was added dropwise with stirring. The reaction mixture was then stirred at room temperature for about 24 hours. 1000 parts of water was then added and the carbon disulfide and methanol were distilled off under vacuum. The precipitate was extracted with chloroform and washed with water to a neutral pH. The product was then stripped of solvent and dried. The resulting product was a yellow crystalling solid identified as the thiocarbonate

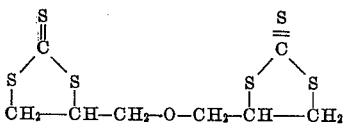

57.9% sulfur.

The above-described thiocarbonate was reduced to the desired polymercaptan in the following manner. 295 parts of lithium aluminum hydride was charged to a reaction vessel equipped with stirrer, condenser and dropping funnel. 2500 parts of anhydrous ether was added to the flask. 753 parts of the carbonate prepared above was dissolved in 2500 tetrahydrofuran and this mixture added dropwise with stirring to the reaction vessel containing the lithium aluminum hydride. The addition was accomplished over a one hour period and the stirring was continued for another 45 minutes. The reactants were then heated to reflux and about 2000 parts of the ether removed. The contents were then cooled and kept at 0–5° C. and water added (about 1500 parts). 800 parts of concentrated HCl was added followed by 1000 parts of water and then 1700 more parts of concentrated HCl. The mixture separated into two layers. The top organic layer was removed, washed, dried and solvent stripped under vacuum. The product was distilled in a molecular still to give a clear, light yellow liquid identified as bis(2,3-dimercaptopropyl) ether.

About 100 parts of diglycidyl ether of 2,2-bis(4-hydroxyphenyl)propane was combined with an equivalent amount of the above-described polymercaptan and 1% by weight of benzyldimethylamine and the mixture heated at 100° C. The resulting product was a hard insoluble casting.

*Example IV*

This example illustrates the use of 1-(1,2-dimercaptoethyl) 3,4-dimercaptocyclohexane as a curing agent for polyepoxides.

100 parts of a glycidyl polyether of 2,2-bis(4-hydroxyphenyl)propane having an epoxy eq./100 g. of 0.53 was combined with 32.6 parts of 1(1,2-dimercaptoethyl) 3,4-dimercaptocyclohexane and 0.5 part of benzyldimethylamine. The mixture was stirred and heated for 2 hours at 100° C. The resulting product was a hard tough casting having a heat distortion point of 107° C. and tensile strength of 11,400 p.s.i.

*Example V*

The preceding example was repeated with the exception that the mixture was allowed to cure at room temperature. The resulting cured product was hard and tough and had good flexibility.

I claim as my invention:
1. A polymercaptan of the group consisting of
(1) polymercaptan polyethers of the formula

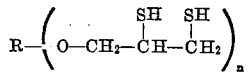

wherein $n$ is 2 to 6 and R is an unsubstituted hydrocarbon radical, (2) polymercaptan polyesters of the formula

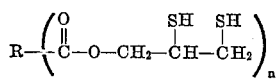

wherein $n$ is an integer of 2 to 6 and R is an unsubstituted hydrocarbon radical, and (3) polymercaptan-substituted hydrocarbons of the formula

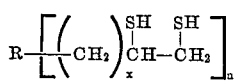

wherein X is an integer of 0 to 6, $n$ is an integer of 2 to 6 and R is an unsubstituted hydrocarbon radical.

2. A polymercaptan of the formula

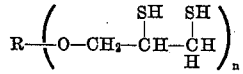

wherein $n$ is 2 to 6 and the R is an unsubstituted hydrocarbon radical.

3. A polymercaptan of the formula

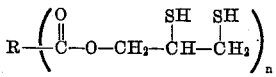

wherein $n$ is an integer of 2 to 6 and R is an unsubstituted hydrocarbon radical.

4. A polymercaptan of the formula

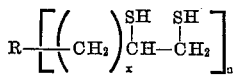

wherein X is an integer of 0 to 6, $n$ is an integer of from 2 to 6 and R is an unsubstituted hydrocarbon radical.

5. A cyclic polymercaptan of the formula

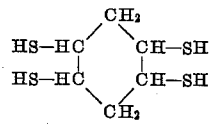

6. A cyclic polymercaptan of the formula

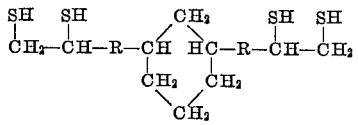

wherein R is a —(CH$_2$)$_n$ radical wherein $n$ is 0 to 10.

7. Di(2,3-dimercaptopropyl)ether.
8. 1-(1,2-dimercaptoethyl)-3,4-dimercaptocyclohexane.
9. 2,3-dimercaptopropyl ether of 2,2-bis(4 - hydroxyphenyl)propane.
10. A process for preparing polymercaptans as described in claim 1 which comprises reacting a polythiirane compound of the group consisting of
(1) polythiiranes of the formula

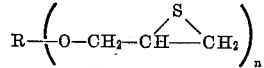

wherein $n$ is 2 to 6 and R is an unsubstituted hydrocarbon radical, (2) polythiiranes of the formula

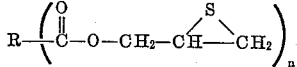

wherein $n$ is an integer of 2 to 6 and R is an unsubstituted hydrocarbon radical, (3) polythiiranes of the formula

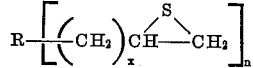

wherein X is an integer of 0 to 6, $n$ is an integer of 2 to 6 and R is an unsubstituted hydrocarbon radical, with hydrogen sulfide in an equivalent ratio of H$_2$S to epoxide of 5:1 to 50:1 in the substantial absence of molecular oxygen.

11. A process for preparing polymercaptans which comprises reacting a polythiirane of the formula

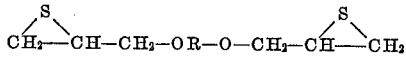

wherein R is an unsubstituted hydrocarbon with hydrogen sulfide in an equivalent ratio of hydrogen sulfide to polythiirane of 5:1 to 50:1 in the substantial absence of molecular oxygen.

(References on following page)

References Cited

UNITED STATES PATENTS

| | | | |
|---|---|---|---|
| 2,995,569 | 8/1961 | Hamilton | 260—327 |
| 3,066,149 | 11/1962 | Slezak | 260—327 |
| 3,067,171 | 12/1962 | Hoppe | 260—47 |
| 3,072,606 | 1/1963 | Zuppinger | 260—47 |
| 3,076,848 | 2/1963 | Laufer | 260—609 |
| 3,076,851 | 2/1963 | Neuworth | 260—609 |

LORRAINE A. WEINBERGER, *Primary Examiner.*

T. L. GALLOWAY, *Assistant Examiner.*